United States Patent [19]

Fujiki

[11] 4,391,513
[45] Jul. 5, 1983

[54] RANGE FINDING OPTICAL MECHANISM

[75] Inventor: Makoto Fujiki, Tokyo, Japan

[73] Assignee: Canon Kabushiki Kaisha, Tokyo, Japan

[21] Appl. No.: 217,823

[22] Filed: Dec. 18, 1980

[30] Foreign Application Priority Data

Dec. 25, 1979 [JP] Japan .......................... 54-179517[U]
Dec. 25, 1979 [JP] Japan .......................... 54-179518[U]
Dec. 25, 1979 [JP] Japan .......................... 54-179519[U]

[51] Int. Cl.³ .......................... G01C 3/10; G03B 7/08
[52] U.S. Cl. ...................................... 356/1; 354/23 R; 354/25; 354/31
[58] Field of Search ...................... 356/1, 4; 354/25 A, 354/25 P, 25 N, 25 R, 23 R, 31

[56] References Cited

U.S. PATENT DOCUMENTS 4,002,852  1/1977  Martin ................................ 179/81
4,004,852  1/1977  Pentecost ........................... 356/1

FOREIGN PATENT DOCUMENTS 2906508  8/1979  Fed. Rep. of Germany .......... 356/4

*Primary Examiner*—S. C. Buczinski
*Attorney, Agent, or Firm*—Fitzpatrick, Cella, Harper & Scinto

[57] ABSTRACT

A device wherein object images are formed on photoelectric converter means arranged in the form of a row by a pair of imaging optical systems fixedly disposed with a base line length therebetween and the spacing between the two images is electrically detected to thereby determine the distance to the object, includes a mechanism with which the two images formed by the pair of optical systems can be relatively displaced and regulated in three directions perpendicular to one another and the row-like photoelectric converter means is rotatable about the optical axis of one of the pair of imaging optical systems and in a plane perpendicular to said optical axis. The entire range finding optical mechanism is rotatable about two axes orthogonal to each other.

6 Claims, 29 Drawing Figures

RANGE FINDING OPTICAL MECHANISM

BACKGROUND OF THE INVENTION

1. Field of the Invention

This invention relates to a range finding optical mechanism having a range finding optical axis regulating mechanism.

2. Description of the Prior Art

Devices of the type in which object images are formed on photoelectric converter means arranged in the form of a row (such as, for example, a photosensor array) by a pair of imaging optical systems disposed with a base line length interposed therebetween and the spacing between the two images is electrically detected to thereby know the distance to the object, have a disadvantage that unless the two images are formed on the row-like photoelectric converter means in the same focused condition and at correct relative positions, a correct range finding signal cannot be obtained and an incorrect distance detection is effected.

Particularly, because the photoelectric converter means is arranged in the form of a row, accurate photoelectric conversion cannot be accomplished unless the object images produced by the pair of imaging optical systems are projected equally on this row.

Also, where the range finding optical system is provided separately with respect to the phototaking optical system, the optical axis of the range finding optical system differs from the optical axis of the phototaking optical system and therefore, the range of range finding (hereinafter referred to as the range finding view field) moves in accordance with the object distance. Also, where the phototaking lens system is a zoom lens system having a magnification changing effect, the size of the range finding view field seen through the viewfinder apparently varies.

On the other hand, in a distance detecting method wherein the photosensor array is laterally placed, the longitudinal size of the sensor is smaller than the lateral size of the sensor and therefore, it is necessary to indicate the range of the range finding view field within the viewfinder and the system should be designed such that the range finding view field varies within that range. However, if a range finding block supporting the entire range finding optical system and the phototaking optical system are simply assembled together, it will be difficult due to the accuracy of parts to have the range finding view field correctly contained within said range.

Accordingly, there has heretofore been a method of regulating the range finding block by means of a three-point screw or the like to set the range finding view field at a predetermined location within the viewfinder, but in this method, it has not been possible to separate horizontal and vertical regulations from each other and fine regulation has been very difficult.

SUMMARY OF THE INVENTION

It is an object of the present invention to provide, in a system using a pair of fixed imaging optical systems to effect range finding, a range finding optical mechanism which can render images to be formed on photoelectric converter means formable in relatively equal conditions.

It is another object of the present invention to provide, in a system using a pair of fixed imaging optical systems to effect range finding, a range finding optical mechanism which can ensure that two images to be formed on photoelectric converter means through the imaging optical systems correctly lie on the photoelectric converter means arranged in the form of a row.

It is still another object of the present invention to provide a range finding optical mechanism which can accurately determine the range finding view field range where the range finding optical system is provided separately with respect to the phototaking optical system of a camera.

According to the present invention, a regulating mechanism is provided in one or both of the imaging optical systems so that the relative imaged positions of two images to be formed on a photosensor array are displaceable in three directions perpendicular to one another, and the formed images are regulatable in three directions, for example, the direction of the optical axis, the row direction of the photosensor array and a direction perpendicular to said two directions and therefore, the object images can be formed in a relatively correct positional relation and in the same focused condition.

According to the present invention, there is provided a regulating mechanism which can cause the photosensor array as photoelectric means arranged in the form of a row to rotate substantially about the optical axis of one of the imaging optical systems and in a plane perpendicular to the optical axis and therefore, it is ensured that two images to be formed through the pair of imaging optical systems correctly lie on the row of the photoelectric converter means.

According to the present invention, the range finding optical system and the photoelectric converter means fixed thereto are made integral with each other and rotatable about two axes perpendicular to each other and therefore, the range finding view field range can be accurately set.

The invention will become more fully apparent from the following detailed description thereof taken in conjunction with the accompanying drawings.

DESCRIPTION OF THE PREFERRED EMBODIMENTS

Figure 1:
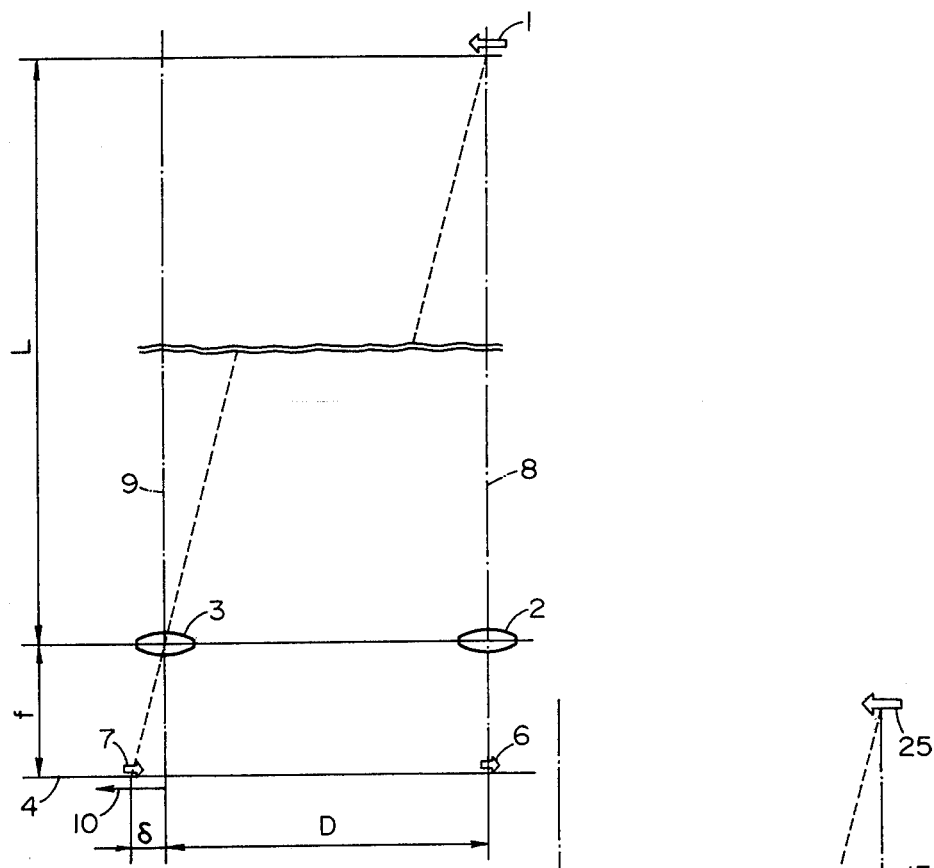
FIG. 1 is a schematic diagram illustrating the principle of the range finding system according to the present invention.

The invention will hereinafter be described in detail with reference to the drawings. Referring to FIG. 1 which illustrates the principle of the distance detecting device of the present invention, reference numeral 1 designates an object as the subject of range finding, reference numerals 2 and 3 designate fixed range finding lenses facing the subject 1 of range finding and disposed with a base line length D therebetween, and reference numeral 4 designates an image formation plane on which the images 6 and 7 of the subject 1 obtained by the range finding lenses 2 and 3 are formed.

Assuming that the subject 1 of range finding lies on the optical axis 8 of the lens 2, the image 6 by the lens 2 is formed at the point of intersection between the image formation plane 4 and the optical axis 8 and on the image formation plane 4 independently of the distance of the subject 1.

On the other hand, assuming that the subject 1 of range finding lies effectively at infinity, the image 7 by the lens 3 is formed at the point of intersection between the image formation plane 4 and the optical axis 9 of the lens 3 and on the image formation plane 4.

Assuming a case where the subject 1 of range finding is located near the lens 2 on the optical axis 8 of the lens 2, the image 6 formed by the lens 2 does not move but the image of the subject 1 formed by the lens 3 moves on the image formation plane 4 in the direction of arrow 10. Here, if the amount of movement 8 of the image 7 formed by the lens 3 when the subject is moved from infinity to its near location is known, the distance L to the subject 1 of range finding can be obtained by the following equation:

$$L = \frac{f \cdot D}{\delta}$$

where f is the distance from the range finding lens to the imaging plane.

What has been described above is the principle of triangular survey itself and is the same principle upon which a double image coincidence type range finder operates. The distance detecting method of the present invention detects the distance to the subject with an electrical system by comparison of the positional relations of two images with each optical system, the two images being formed by a first optical system for forming a reference image and a second optical system for forming a comparison image disposed with a predetermined base line length therebetween. As this electrical system, the one such as that disclosed, for example, in U.S. Pat. No. 4,004,852, or U.S. patent application Ser. No. 040,907 filed Jan. 29, 1982, is desirable.

Figure 2:
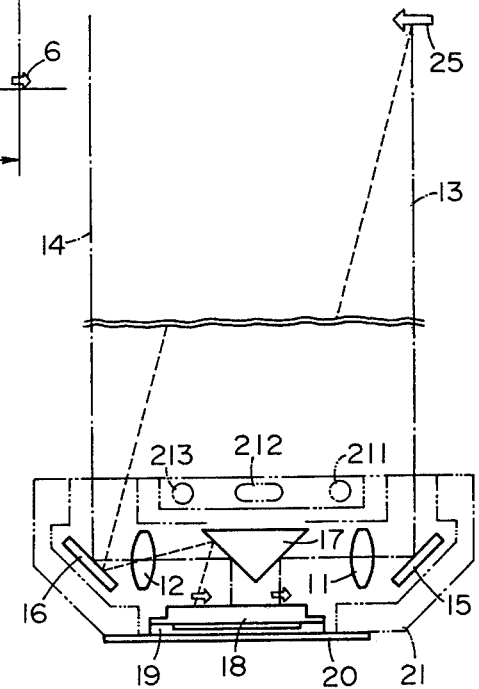
FIG. 2 is a partial schematic cross-sectional view of the range finding device according to the present invention.

FIG. 2 is a schematic cross-sectional view of the range finding optical mechanism of the present invention taken on a plane containing the range finding optical axis. In FIG. 2, reference numerals 11 and 15 designate a range finding lens and a total reflection mirror, respectively, of a first optical system which aims at the subject 25 of range finding on the optical axis 13 thereof. Denoted by 12 and 16 are a range finding lens and a total reflection mirror, respectively, of a second optical system on an optical aixs 14 spaced apart a predetermined base line length from the first optical system and parallel to the optical axis 13. Designated by 18 is a line-like photosensor array disposed in the form of a line on a plane containing the optical axes 13 and 14 of the first and second optical systems. Reference numeral 17 designates a prism for directing to the photosensor array 18 the two images of the subject 25 of range finding obtained by the first and second optical systems 11 and 12. Designated by 19 is a sensor mounting member on which the photosensor array 18 is mounted, and denoted by 20 is a sensor mounting around plate for mounting thereon the sensor mounting member 19 and for fixing it to a range finding block 21.

The photosensor array 18 is photoelectric converter means known as a CCD photodetector or photodiode array, and is a well-known element which can generate an electrical signal corresponding to the illumination distribution of the image obtained on the sensor, as a time-serial signal.

In such a system, if the spacing between the optical axes 13 and 14 on the sensor differs or if a vertical positional deviation occurs, a great error will arise in the distance detection. Also, if a focus difference exists between the images on the sensor by the range finding lenses 11 and 12, an error will also arise.

Such error-producing states will be explained by reference to FIGS. 4 to 6. FIGS. 4A, 4B and 4C are schematic views illustrating the imaged condition of a subject on the sensor by the range finding optical system according to the present invention.

Figure 4A:
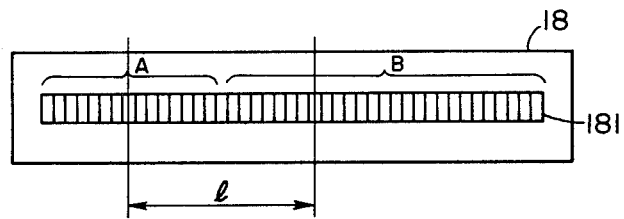
FIGS. 4A, 4B and 4C are schematic views for illustrating the imaged condition on a photosensor array as the row-like photoelectric converter means according to the present invention.

FIG. 4A is a schmatic view of the photosensor array 18 equivalent to photoelectric converter means arranged in the form of a row.

In FIG. 4A, the photosensor array 18 has a lightsensing member 181 divided into a number of bits, and the interior thereof is divided into a portion A used in the first optical system and a portion B used in the second optical system. The spacing 1 between the images, on the sensor, of the optical axis 13 of the first optical system 11 and the optical axis 14 of the second optical system 12 which come effectively from infinity is set to a predetermined width.

Figure 3:
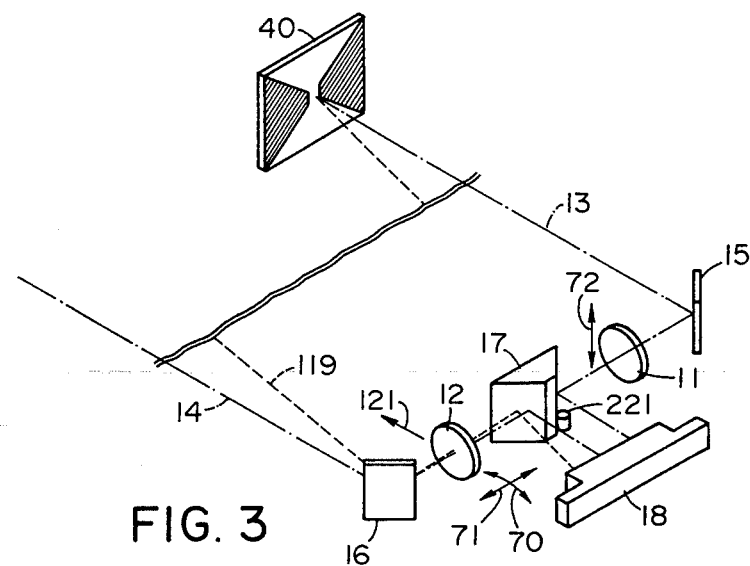
FIG. 3 is a schematic perspective view of the range finding optical mechanism according to the present invention.
Figure 4B:
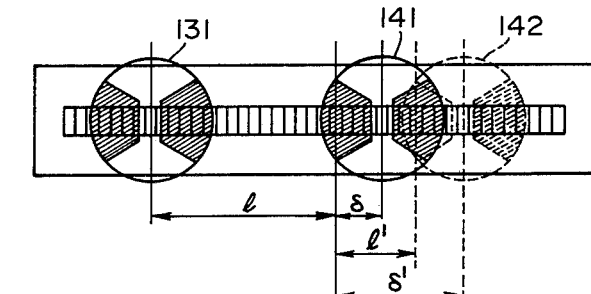

FIG. 4B is a schematic view showing the imaged condition, on the sensor, of the chart 40 shown in FIG. 3.

Reference numeral 131 designates the image of the subject of range finding formed on the sensor by the first optical system 11, and reference numeral 141 denotes the image when the optical axis 14 of the second optical system has been properly imaged.

When images are so formed at correct positions, the variation $\delta$ in the spacing between the two images can be known accurately, whereby the distance to an object can be correctly detected. On the other hand, an image 142 indicated by broken line results when the range finding lens 12 has been moved in the direction of arrow 121 in FIG. 3, and the position of the optical axis 14 moves by l' from the correct position. Thereupon, the image of the subject of range finding by the second optical system is formed at the position 142 and the amount of movement $\delta$ of the original image becomes $\delta'$. Therefore, accurate range finding becomes impossible.

Figure 4C:
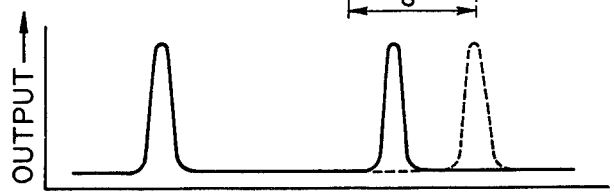

FIG. 4C shows the state of the electrical output in the state shown in FIG. 4B.

In FIG. 4C, the solid line refers to a case where the optical axes of the first and second optical systems have been correctly regulated, and the broken line refers to a case where said optical axes have been unsatisfactorily regulated.

Figure 5A:
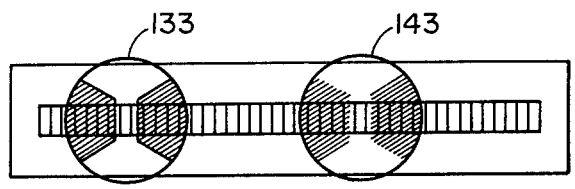
FIGS. 5A and 5B are schematic views in a case where there is a relative deviation of focus direction in a pair of imaging optical systems.
Figure 5B:
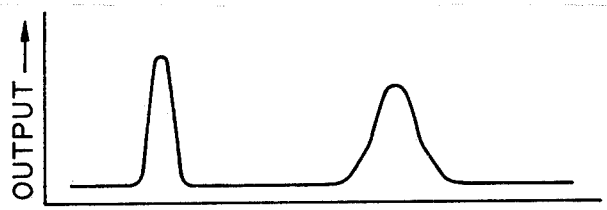

FIGS. 5A and 5B show a condition in which a focus difference exists on the sensor between the images of the subject of range finding produced by the range finding lenses 11 and 12. In FIG. 5A, reference numerals 133 and 143 designate images formed on the sensor by the first and the second optical system, respectively. In this Figure, the image 133 is in focus at the light-sensing portion of the sensor and the image 143 is defocused. FIG. 5B shows the sensor output signal at this time and, as is apparent from this Figure, a difference arises between the distributions of the images and in some cases, detection of the peak value becomes impossible or the signal processing by an electrical processing circuit, not shown, is not accurately effected with a result that incorrect range finding results.

Figure 6A:
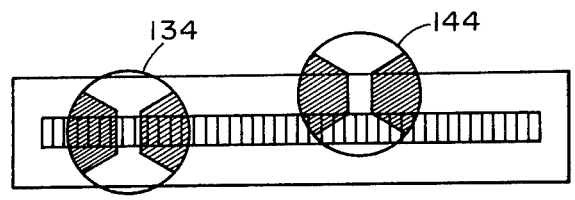
FIGS. 6A and 6B are schematic views in a case where there is a relative deviation of vertical direction in the pair of imaging optical systems.

FIG. 6A is a schematic view showing the imaged condition when the first and second optical systems are relatively deviated in the direction of arrow 72 shown in FIG. 3.

Figure 6B:

In FIG. 6A, reference numerals 134 and 144 designate the images of the subject of range finding formed on the sensor by the first and the second optical systems, respectively. FIG. 6B shows the electrical output at this time and, as is apparent from this Figure, if the images of the subject of range finding deviate vertically relative to one another to thereby cause creation of entirely different electrical signal pattern than expected, correct range finding will become difficult or impossible.

As described above, in a range finding system wherein images are formed on a row-like photoelectric converter means by a pair of imaging optical systems for range finding and the distance to an object is known from the positional relation between the two images, it is necessary from the limitation of the signal processing by the electric circuit thereof to cause the two images to lie at correct relative positions on a predetermined line.

In other words, if the two images can be caused to lie at correct relative possitions of the photoelectric converter means arranged in the form of a row, the subsequent electrical signal processing circuit may be of simpler construction.

Therefore, in the present invention, by providing a first regulating mechanism, the relative positional relation between the images by the pair of imaging optical systems is made regulatable in three directions perpendicular to one another and moreover, in order that the regulating operation may be carried out more smoothly, said three directions are defined as the direction of the optical axis, the row direction of the row-like photoelectric conversion elements perpendicular to said direction of the optical axis, and a direction perpendicular to said rwo direction and said direction of the optical axis.

This direction of regulation is specifically shown in FIG. 3, wherein reference numeral 221 designates a pin projected into a range finding block to be described and used to position the prism 17. The positioned prism and the total reflection mirrors 15, 16 are made parallel and fixed in a condition in which the optical systems 11 and 12 are absent. Thereafter, each optical system is installed and, by displacing and regulating the second optical system 12 in the direction of arrow 70, the relative position of the image by the second optical system and of the image by the first optical system is regulated in the row direction of the line-like photosensor array. By displacing and regulating the second optical system in the direction of arrow 71, the image by the second optical system is displaced in the direction of the optical axis, thereby enabling the relative focusing of the images by the first and second optical systems.

Further, by displacing and regulating the first optical system in the direction of arrow 72, the image by the first optical system is made regulatable in a direction perpendicular to said direction of the optical axis and perpendicular to said direction of the sensor array, namely, in the vertical direction of FIG. 3.

The regulation of the second optical system 12 in the direction of arrow 70 is through an accurate path of displacement, but in a minute angular range, it can be approximately regarded as a straight line.

Figure 7:
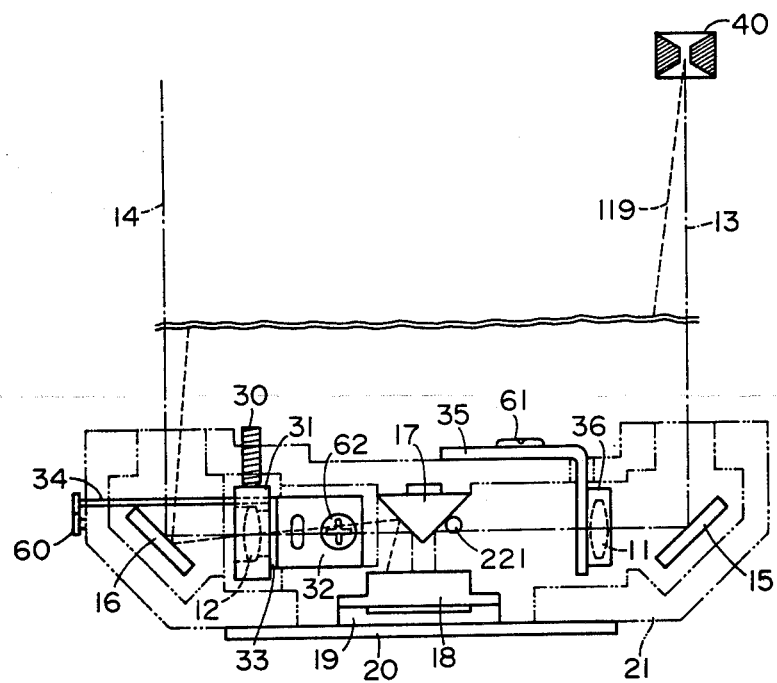
FIG. 7 is a cross-sectional view of a first regulating mechanism taken on a plane containing the imaging optical axis of the range finding optical system according to the present invention.

FIG. 7 is a cross-sectional view of a specific construction of the first regulating mechanism according to the present invention taken on a plane containing the optical axes 13 and 14.

In the present embodiment, as previously described, the second optical system 12 performs the regulating function in the directions of arrows 70 and 71 of FIG. 3 and the first optical system performs the regulating function in the direction of arrow 72. In FIG. 7, parts similar to those of FIG. 3 are given similar reference numerals. Reference numerals 30–33, 60 and 62 designate members forming the regulating mechanism of the second optical system, and reference numerals 35, 36 and 61 designate members forming the regulating mechanism of the first optical system.

Figure 8:
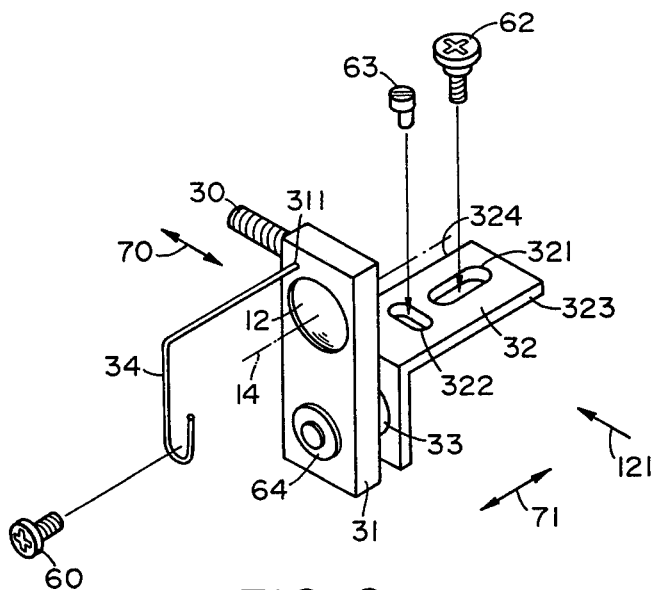
FIG. 8 is an exploded perspective view of the regulating mechanism of a second optical system.

FIG. 8 is an exploded perspective view of the regulating mechanism of the second optical system.

Reference numeral 12 designates the second optical system, reference numeral 31 denotes a lens holder for holding that optical system, and reference numeral 33 designates a holder mounting shaft which is rotatably caulked to the lens holder 31 through a washer 64. The other end of the holder mounting shaft 33 is caulked to a holder mounting plate 32.

Designated by 34 is a wire spring having one end inserted in a hole 311 provided in the holder 31 and the other end bent in U-shape and secured to a range finding block 21 by a screw 60. The wire spring 34 has such resiliency as to effect a bias in the direction of arrow 121. Denoted by 30 is a set screw for regulating the lens holder 31 in the direction of arrow 70.

Reference numeral 62 designates a screw for securing the mounting plate 32 to the range finding block 21 through a slot 321 in the holder mounting plate. Reference numeral 63 denotes an eccentric screw for regulating the second optical system 12 in the direction of arrow 71. The eccentric screw 63 fits in a slot 322 provided in the mounting plate 32, and a support shaft fits in an unshown hole provided in the range finding block. In this case, the end surfaces 323 and 324 of the mounting plate 32 are fitted in and guided by unshown slots of the range finding block, and by rotating the eccentric screw 63, and regulation in the direction of arrow 71 is made possible.

Figure 9A:
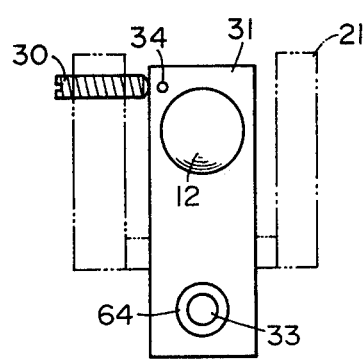
FIGS. 9A and 9B illustrate the regulating condition of the regulating mechanism of the second optical system.
Figure 9B:
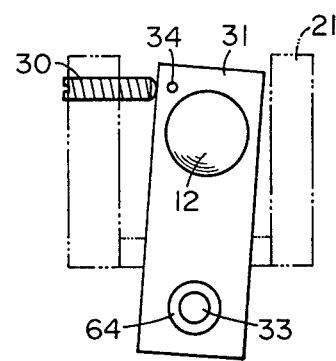

The regulating conditions of the regulating mechanism of the second optical system is shown in FIGS. 9A and 9B.

In FIG. 9A, and 9B similar members are given similar reference numerals.

FIG. 9A shows a condition in which the optical axis has not yet been regulated, and FIG. 9B shows a condition in which the optical axis has been regulated.

In FIG. 9B, the set screw 30 is rotated to extend rightwardly, whereby the lens holder 31 is pivotally displaced about a pivot 33 against the resiliency of the wire spring 34 and the optical axis 12 of the second optical system is regulated in the direction of arrow 70 of FIG. 8.

The displacement of the lens holder 31 is by rotational movement and therefore, the relative displacement in the direction of arrow 70 of FIG. 3 also occurs at the same time.

However, the amount of displacement in the direction of arrow 70 is only 0.0005 mm even if the amount of regulation by the set screw is 0.1 mm when the distance between the mounting shaft 33 and the optical axis is 10 mm, and therefore it is practically negligible.

Figure 10:
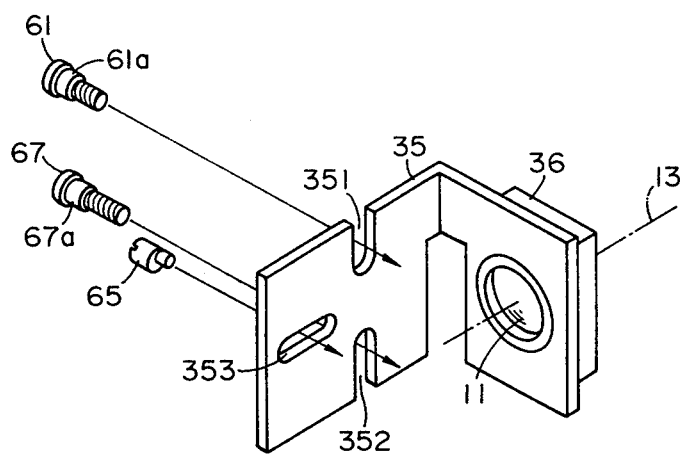
FIG. 10 is an exploded perspective view of the regulating mechanism of a first optical system.

FIG. 10 is an exploded perspective view of the regulating mechanism of the first optical system shown in FIG. 7.

In FIG. 10, reference numeral 35 designates a lens supporting plate secured to a lens supporting member 36 for holding the first optical system 11.

The lens supporting plate is provided with U-shaped grooves 351 and 352 into which stepped screws 61 and 67 for fixing the supporting plate to the range finding block, not shown, may be inserted.

Designated by 65 is an eccentric pin for regulating the first optical system 11 in the direction of arrow 72. The eccentric pin 65 fits in a slot 353 provided in the lens supporting plate 35, and a support shaft is fitted in and rotatably caulked to a hole of the unshown range finding block. By rotating the eccentric pin 65, the stepped portions 61a and 67a of the stepped screws 61 and 67 are guided in the U-shaped grooves 351 and 352 of the supporting plate 35 which is displaced and regulated in the direction of arrow 72 of the optical system 11. Accordingly, the image can be regulated to relatively the same height position as the image by the second optical system.

As described above in detail, according to the first regulating mechanism of the present invention, there is provided a detecting method and apparatus in which two object images by a pair of imaging optical systems are formed on photoelectric converter means arranged in the form of a row such as a photosensor array and the spacing between the two images is electrically detected to indicate the distance to the object. The imaged positions of the two images formed by the imaging optical systems are relatively regulatable in three directions perpendicular to one another and therefore, a photoelectrically converted range finding signal may be accurately obtained and range finding of high accuracy may be accomplished. On the other hand, the imaged conditions of the two images are substantially equal to each other and therefore, the signal processing subsequent to detection by the photoelectric converter means can be very much simplified. That is, there is also an effect that the sensitivity and other functions of the signal processing circuit need not be enhanced more than necessary.

FIGS. 11A–11D illustrate a second problem which has heretofore occurred to the range finding system of the present invention.

Figure 11A:
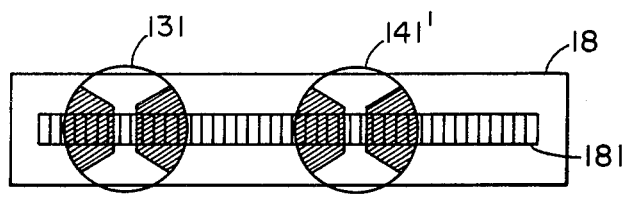
FIGS. 11A, 11B, 11C and 11D illustrate the source of another error peculiar to the range finding system according to the present invention.
Figure 11B:
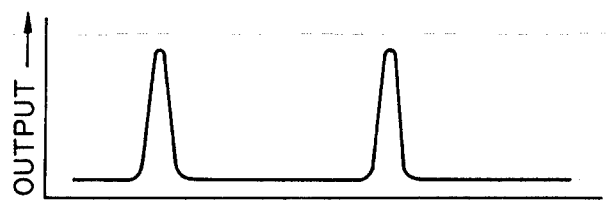

In FIG. 11A, reference numeral 131 designates the image of the subject of range finding formed on the photosensor array 18 by the first optical system 11, and reference numeral 141' denotes the image of the subject formed by the second optical system 12. If, as shown in FIG. 11A, the light-sensing portion 181 of the photosensor array is parallel to the straight line passing through the two images formed by the first and second optical systems, the output of the light-sensing portion 181 will become such as shown in FIG. 11B and the form of the sensor output for distance detection will also become the same as the images formed by the first and second optical systems, thus enabling correct range finding.

Figure 11C:
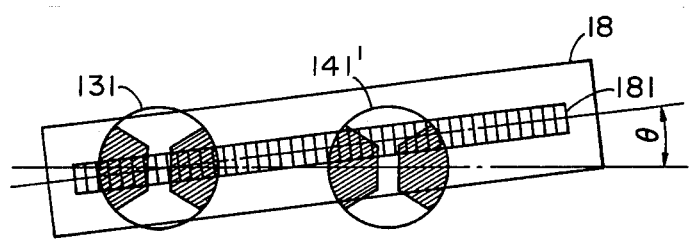
Figure 11D:
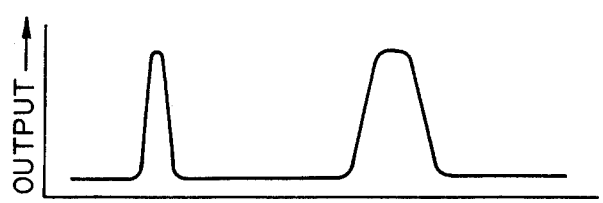

However, if, as shown in FIG. 11C, the light-sensing portion 181 of the sensor intersects the images by the first and second optical systems at an angle $\theta$, the forms of the output signals representative of the images by the first and second optical systems through the sensor will become different as shown in FIG. 11D in spite of the output signal thereof seeing the same subject 40 of range finding. Accordingly, again in this case, correct distance detection is not accomplished.

Figure 12:
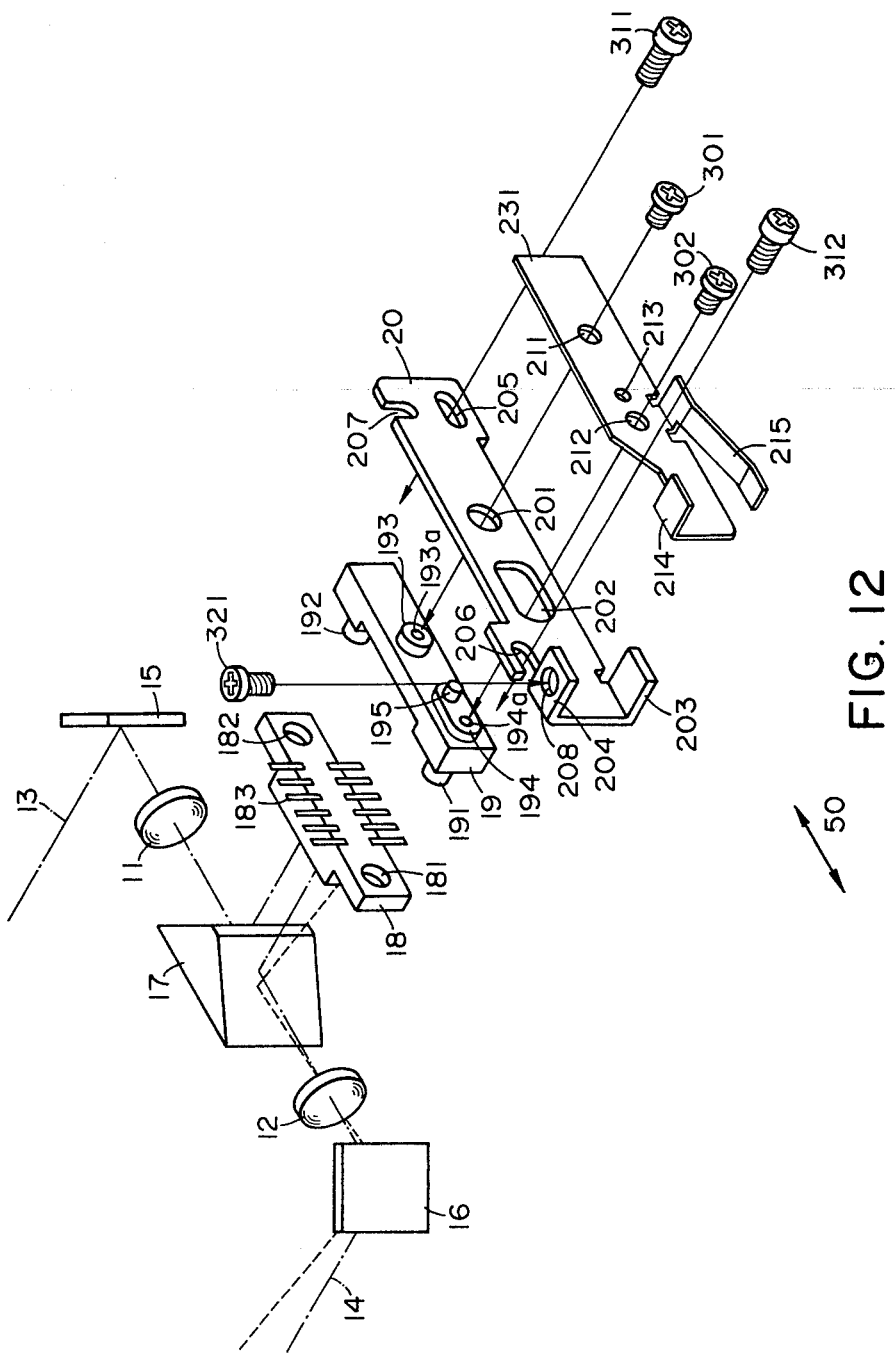
FIG. 12 is an exploded perspective view of a second regulating mechanism in accordance with the present invention.

FIG. 12 is an exploded perspective view of a second regulating mechanism according to the present invention. In FIG. 12, members similar to those of FIG. 2 are given similar reference numerals.

As previously described, the sensor mounting ground plate 20 is fixed to a camera by being fixed to the range finding block 21 shown in FIG. 2. In contrast, in the present embodiment the photosensor array 18 is fixed to the sensor mounting member 19 which in turn is secured to a sensor regulating spring base plate 231 with the sensor mounting ground plate 20 interposed therebetween, and in that case, the sensor mounting member 19 is rotatively regulated relative to the sensor mounting ground plate 20.

Specifically, in the photosensor array 18, there are several electrical terminals 183 and mounting holes 181, 182. On the sensor mounting member 19, there are pins 191 and 192 which are to fit in the mounting holes 181 and 182 and, by the mating therebetween, the photosensor array 18 is fixed to the sensor mounting member 19.

Projections 193 and 194 are provided on the opposite side of the sensor mounting member 19 to the pins 191 and 192, and threaded holes 193a and 194a are provided in the projections 193 and 194. A pin 195 is projected from the projection 194. The sensor mounting ground plate 20 is provided with slots 205 and 206 for fixing the ground plate 20 to the range finding block (shown in FIG. 2) by means of screws 311 and 312, and is also provided with an aperture 207 into which an eccentric screw, not shown, may be inserted in order to render the sensor mounting ground plate 20 regulatable in the direction of arrow 50 during the fixing of the ground plate. The ground plate 20 is further provided with an aperture 201 which can rotatably mate with the projection 193, and an aperture 202 having a diameter greater than that of the projection 194.

Also, as shown, bent portions 203 and 204 are provided in a part of the sensor mounting ground plate 20, the bent portion 204 being provided with an aperture 208 which may be threadably engaged by a rotatable regulating screw 321. A sensor regulating spring base plate 231 is provided with threaded holes 211, 212 and an aperture 213 into which the pin 195 may fit. A screw 301 may threadably engage the threaded holes 211 and 193a and a screw 302 may threadably engage the threaded holes 212 and 194a so that the sensor regulating spring base plate 231 may be secured to the sensor mounting member 19 with the sensor mounting ground plate 20 interposed therebetween.

The pin 195 fits in the aperture 213 to prevent backlash from occurring when the mounting member 19 and the base plate 231 are rotatively regulated with respect to the sensor mounting ground plate 20. The sensor regulating spring base plate 231 is provided with a spring portion 215 which bears against the bent portion 203 to bias it downwardly and is also formed with a bent portion 214 against which the end of the rotatable regulating screw 321 may bear.

With the above-described construction, by threading the rotatable regulating screw 321 into the aperture 208, the base plate 231 is depressed downwardly against the resiliency of the spring portion 215 and rotatively regulated with the projection 193 as the axis. After the regulation, by tightening the screws 311 and 312, the member 19 and the base plate 231 are clamped together with the sensor mounting ground plate 20 interposed therebetween and the sensor 18 is fixed in a proper condition.

Figure 13A:
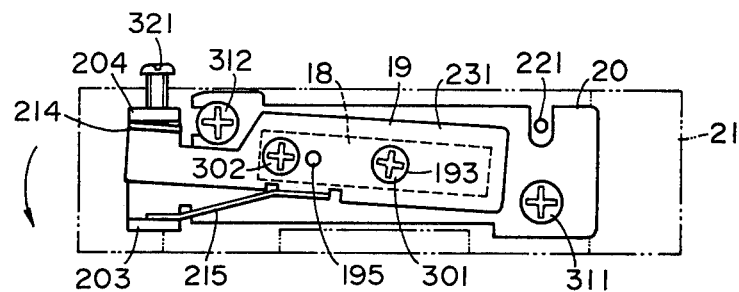
FIGS. 13A and 13B show an example of the regulation of the second regulating mechanism of the present invention.
Figure 13B:
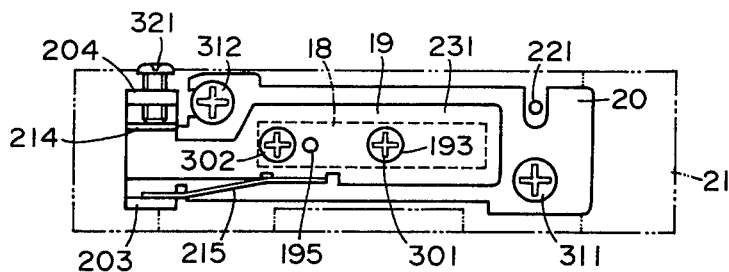

Reference is now had to FIGS. 13A and 13B to describe the method of rotatively regulating the photosensor array by the above-described second regulating mechanism of the present invention.

In FIG. 13A and 13B, parts identical to those of FIG. 12 are given identical reference numerals. Designated by 21 is the range finding block. FIG. 13A shows a condition in which, because of the sensor mounting member 19 being inclined, the images of the subject of range finding by the first and second imaging optical systems are not correctly formed on the photosensor array 18. In FIG. 13A, when the regulating screw 321 is threaded in as shown in FIG. 13B to cause two images to be correctly formed on the sensor, the sensor mounting member 19 and the sensor regulating spring base plate 231 are rotated in the counter-clockwise direction and regulated, as viewed in FIG. 13A, against the resiliency of the spring portion 215 of the sensor regulating spring base plate 231 with the projection 193 (substantially the same position of the optical axis 13 shown in FIG. 2) as the axis of rotation. FIG. 13B shows the condition after such regulation.

As described above in detail, the second regulating mechanism of the present invention is a device in which object images formed by a pair of imaging optical systems are separately formed on photoelectric converter means arranged in the form of a row such as a photosensor array and the relative positional relation between the two images is processed as an electrical signal to thereby measure the distance to the object. The row-like photoelectric converter means are rotatable in a plane perpendicular to the optical axis so that the two images formed by said pair of optical systems are formed at correct positions on the row-like photo-electric converter means. Accordingly, there is created an effect that a range finding error peculiar to the range finding device of this type can be completely eliminated.

Further, if this mechanism is designed such that this rotative regulation is accomplished about the optical axis of one of said pair of imaging optical systems, the regulation becomes very easy to do.

Description will hereinafter be made of a third problem which has heretofore occurred to the range finding system of the present invention.

That is, in a case where, as shown in FIG. 2, the range finding optical systems 11, 12 and the range finding block 21 supporting the photosensor array 18 are disposed at positions separate from the phototaking optical system, there is a problem that the location of the range finding view field moves depending on the object distance. Also, where the phototaking optical system includes a zoom lens, there is a problem that the size of the range finding view field in the viewfinder varies in accordance with the focal length. This will be described by reference to FIGS. 14 and 15.

Figure 14:
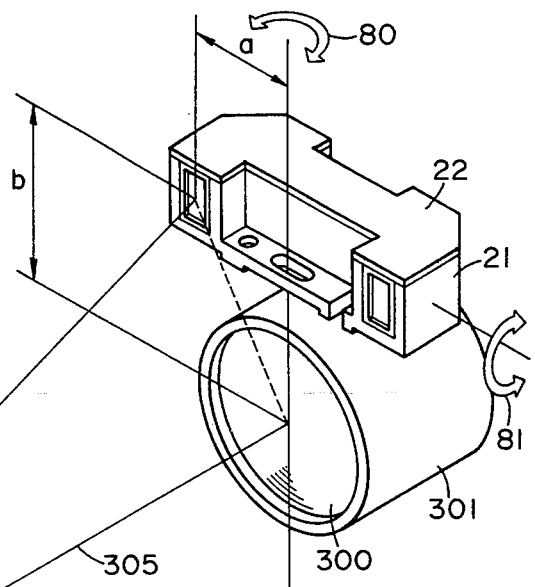
FIG. 14 shows an example of the arrangement of the phototaking optical system and the range finding optical system.
Figure 15:
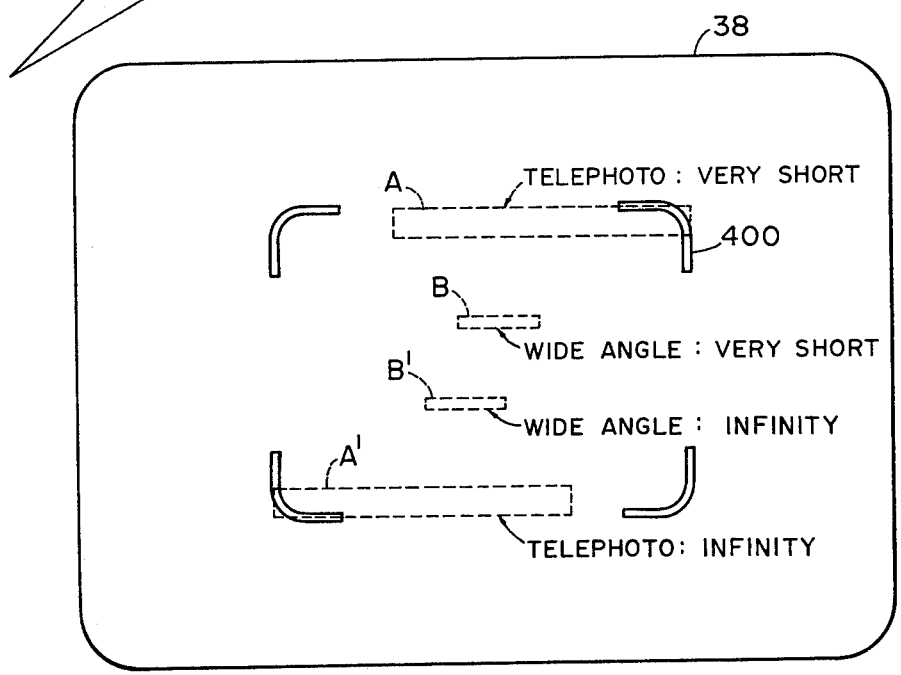
FIG. 15 illustrates the range finding view field by the range finding optical mechanism according to the present invention.

FIG. 14 is a perspective view of the range finding block 21 containing therein the range finding optical system according to the present invention and the phototaking optical system. Designated by 300 is a phototaking lens which has an optical axis 305 and a lens barrel 301. In FIG. 14, the range finding block 21 is disposed above the phototaking lens and the first range finding optical system is spaced apart from the optical axis of the phototaking lens laterally by a and upwardly by b. Denoted by 22 is the block cover of the range finding block 21. The optical axis 13 of the first range finging optical system and the optical axis 305 of the phototaking lens optical system are set so as to intersect each other at a predetermined distant position. FIG. 15 illustrates the size of the range finding view field seen through the view finder at that time. In FIG. 15, reference numeral 38 designates the viewfinder view field, and reference numeral 400 denotes a range finding view field mark indicating the range finding view field corresponding to the range which is range-found in the viewfinder.

In a case where the phototaking lens is a zoom lens and as shown in FIG. 14, and the first range finding optical system is spaced apart with respect to this phototaking lens laterally by a and upwardly by b, the size and position of the actual range finding view field imaged on the photosensor array become different depending on the focal length and the object distance as indicated by A, A', B, B'.

That is, where the zoom lens is in telephoto condition and the object distance is very short, the actual range finding view field by the sensor becomes large as indicated at A in FIG. 15 and shifts to the rightward and upward portion of the viewfinder. Conversely, where the zoom lens is in telephoto condition and the object distance is effectively infinity, the actual range finding view field shifts to the leftward and downward portion of the viewfinder as indicated at A'. In wide angle condition, as compared with the telephoto condition, the actual range finding view field by the sensor shifts to a narrow range B—B' near the center of the viewfinder.

In order that the range finging view field of the photosensor array of the actual range finding optical system may be correctly put into the range finding view field mark thus predetermined in the viewfinder, such regulation must be done that, as shown in FIG. 14, the optical axis 305 of the phototaking lens and the optical axis 13 of the first range finding optical system intersect each other at a predetermined distance position. Moreover, in the present invention, the regulation therefor can be effected separately in the direction of arrow 80 and the direction of arrow 81 indicated in FIG. 14.

Figure 16:
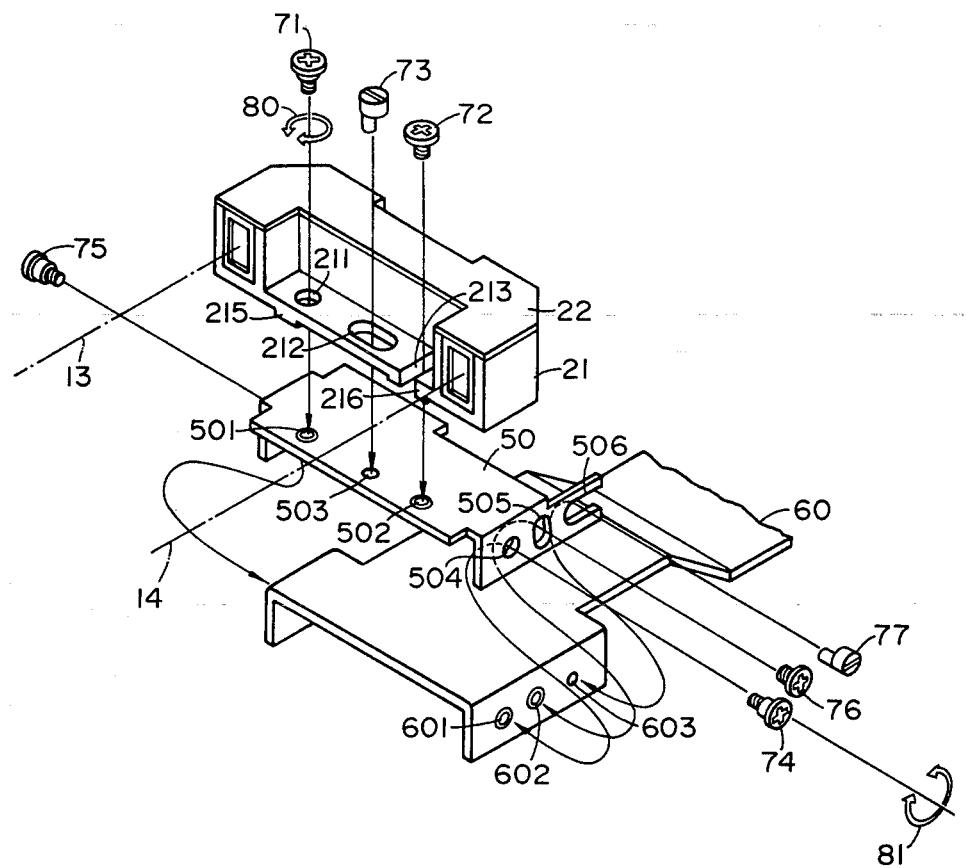
FIG. 16 is an exploded perspective view of a third regulating mechanism in accordance with the present invention.

FIG. 16 is an exploded perspective view of an embodiment of a third regulating mechanism of the present invention. Reference numeral 50 designates a block ground plate, and reference numeral 60 denotes a fixed member. The fixed member 60 is fixed to a camera body, not shown, or to a fixed lens barrel, not shown. Designated by 211 is an aperture provided in the range finding block 21 that provides a center of rotation about which the range finding block 21 is pivoted in the direction of arrow 80. A stepped screw 71 fits in the aperture 211, whereafter it threadably engages a threaded hole 501 in the block ground plate. Denoted by 212 is a slot provided in the range finding block 21. An eccentric pin 73 fits in the slot 212 and is rotatably caulked in an aperture 503 formed in the ground plate 50. Designated by 213 is a U-shaped hole for fixing the range finding block regulated in the direction of arrow 80, by means of a screw 72. The screw 72 is inserted into the U-shaped hole 213, whereafter it threadably engages a threaded hole 502 formed in the ground plate 50.

The block ground plate 50 is further provided with an aperture 504 which provides a center of rotation about which the range finding block is pivoted and regulated in the direction of arrow 81. A stepped screw 74 fits in this aperture 504, whereafter it threadably engages a threaded hole 601 provided in the fixed member 60. Designated by 506 is a U-shaped groove provided in the ground plate 50. An eccentric screw 77 fits in this U-shaped groove, whereafter it is rotatably caulked in an aperture 603 formed in the fixed member 60. Reference numeral 505 denotes a slot for fixing the block ground plate 50 regulated in the direction of arrow 81 to the fixed member 60 by means of a screw 76. The screw 76 is inserted into the slot 505, whereafter it threadably engages a threaded hole 602 formed in the fixed member 60. On the opposite sides of the block ground plate 50 and the fixed member 60 to the apertures 504 and 601, there are also provided corresponding apertures and these are coupled together by a stepped screw 75.

Figure 17A:
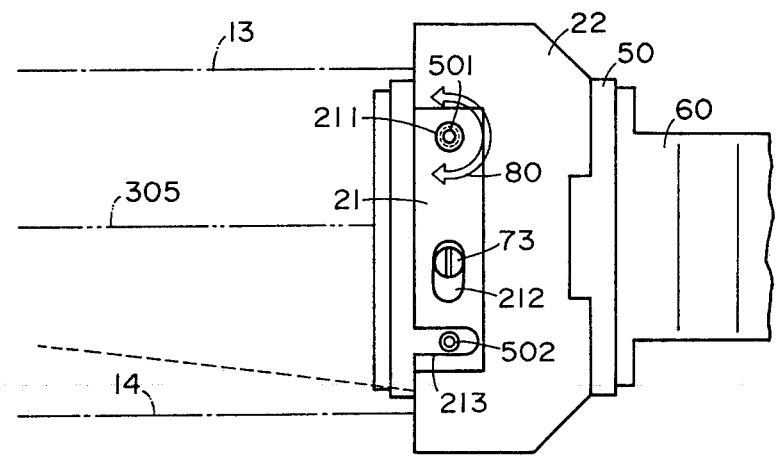
FIGS. 17A and 17B illustrate the horizontal regulating operation of the range finding optical axis by the third regulating mechanism.
Figure 17B:
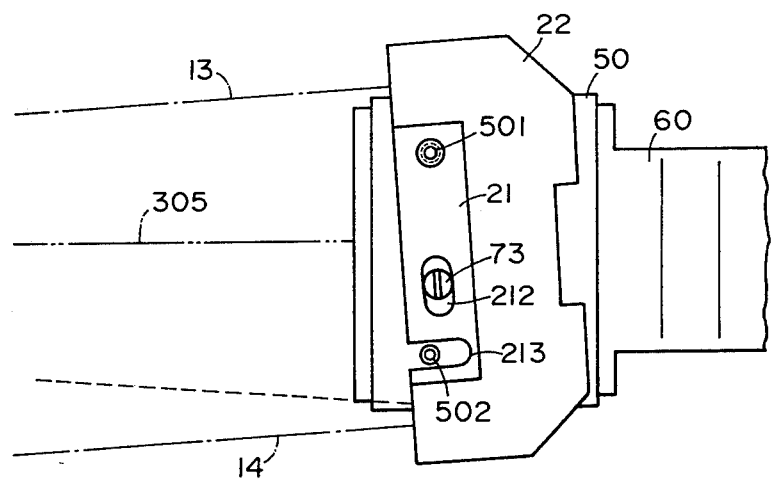

FIGS. 17A and 17B illustrate the rotative regulating condition in the direction of arrow 80 by the third regulating mechanism of the present invention shown in FIG. 16. FIG. 17A shows the condition before the regulation, and FIG. 17B shows the condition after the regulation.

In FIGS. 17A and 17B, members identical to those of FIG. 16 are given identical reference numerals.

In FIG. 17A, when the range finding block 21 has been seen from above, the optical axis 305 of the phototaking optical system is parallel to the optical axis 13 of the first range finding optical system. By rotating the eccentric screw 73, fine rotative regulation is effected with the screw hole 501 of the range finding block as the axis so that, as shown in FIG. 17B, the optical axis 13 and the optical axis 305 come to intersect each other at a predetermined distant position.

Figure 18A:
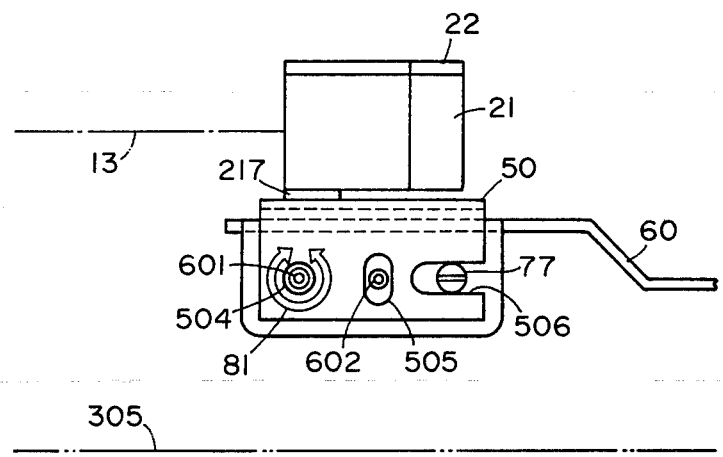
FIGS. 18A and 18B illustrate the vertical regulating operation by the third regulating mechanism.
Figure 18B:
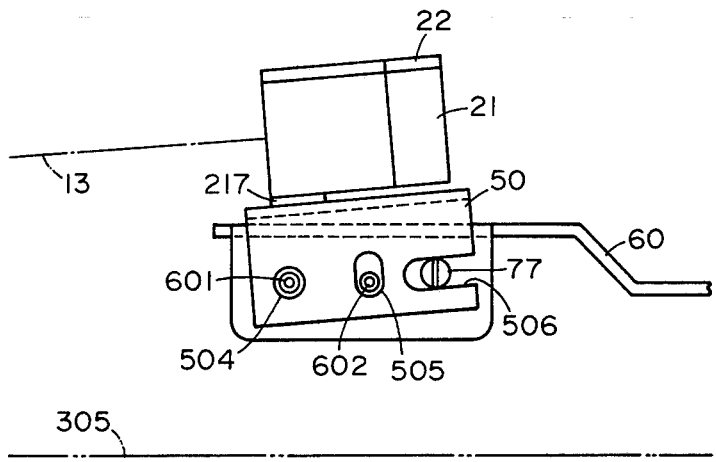

FIGS. 18A and 18B illustrate the rotative regulating condition in the direction of arrow 81 by the third regulating mechanism of the present invention shown in FIG. 16. In FIG. 18, members identical to those of FIG. 16 are given identical reference numerals.

FIGS. 18A and 18B are views of the range finding block as seen from the side thereof. FIG. 18A shows the condition before the regulation, in which the optical axis 13 of the first optical system is parallel to the phototaking optical system 305. By rotating the eccentric screw 77 and finely regulating the block ground plate 50 in the direction of arrow 81 with the screw hole 601 of the fixed member 60 as the center of rotation, the optical axis 13 of the first range finding optical system and the phototaking optical axis 35 come to intersect each other at a predetermined distant position as shown in FIG. 18B.

Accordingly, as described in connection with FIG. 3, the range finding view field is symmetrically distributed into a rightward upward portion and a leftward downward portion in accordance with the very short distance and the effectively infinite distance with the central position of the viewfinder as the center. Moreover, the regulating operation is separated into two directions and thus, the regulation becomes very easy.

The apertures 211 and 213 for fixing the range finding block 21 to the block ground plate 50 may preferably be spaced as much as possible from the total reflection mirrors 15, 16 and the range finding optical system lenses 11, 12, as shown in FIG. 2. This is because, when the range finding block is fixed to the block ground plate by means of screws 71 and 72, if said apertures are near the mirrors and lenses, an internal stress will be created within the block by a tightening force to cause the positions of the regulated mirrors and lenses to become misaligned. However, greatly spacing these apertures apart from the mirrors and lenses would be difficult given considerations of the form and external appearance of the camera and therefore, it is desirable to provide these apertures at the positions as shown in FIG. 2. Also, as regards the surface of the range finding block which contacts the block ground plate, if the entire bottom surface of the range finding block contacts the block ground plate, the mirrors and lenses may possibly become misaligned depending on the accuracy of that surface when they are tightened by screws. For this reason, it is desirable that, as indicated at 215 and 216 in FIG. 16 and at 217 in FIGS. 18A and 18B, convex portions be provided only around the apertures 211 and 213 so that the surface area which contacts the block ground plate is small.

As described above in detail, the third regulating mechanism is a regulating mechanism for causing the range finding optical axis and the phototaking optical axis to intersect each other at a predetermined distant position and moreover for accurately adjusting this position in order to cause the range finding view field to be widened symmetrically about the central position of the viewfinder in a system wherein range finding is effected by a distance detecting optical system different from the phototaking optical system. In this regulating mechanism, the optical axis of the range finding optical system that provides the standard is made rotatively regulatable independently in the vertical direction and the horizontal direction.

The optical axis need not always be regulatable in vertical and horizontal directions, but of course it may be rotated with two orthogonal straight lines as the axis.

Accordingly, there is an effect that the range finding optical axis can easily be adjusted to any predetermined position of the phototaking optical axis by a simple regulating mechanism and further, where the actual range finding view field is limited by the photosensor array or the like, this view field can easily be contained within a symmetrical range centered at the central position of the viewfinder. If the photographer catches an object within the view field mark shown in FIG. 15, the object will be reliably imaged on the range finding view field of the sensor array and range finding will be accomplished correctly.

I claim:

1. A range finding optical mechanism including:
  (a) a pair of fixed range finding optical systems each having an entrance window for introducing therethrough the light from the subject of range finding, said entrance windows being spaced a predetermined distance from each other, said range finding optical systems being adapted to form object images separately on a predetermined imaging plane, the spacing between said formed images being variable in accordance with the distance from said optical systems to the subject;
  (b) photoelectric converter means including a plurality of photosensitive elements arranged in the form of a row on said imaging plane, said photosensitive elements comprising two sections which together define said row, each of said sections corresponding to one of said pair of range finding optical systems, each of said optical systems being arranged to form an image of the subject on one of said two sections and said photoelectric converter means generating electrical signals corresponding to the illumination distributions of the images so formed; and
  (c) a regulating device for said photoelectric converter means, said regulating device including first regulating means for displacing said photoelectric converter means in a plane generally perpendicular to the optical axes of said pair of range finding optical systems and in a direction parallel to a line passing through the optical axes of said pair of range finding optical systems, and second regulating means for rotatively displacing said photoelectric converter means in a plane perpendicular to the optical axes of said pair of range finding optical systems and about a pivot axis substantially coincident with the center of the area of one said section of said photosensitive elements of said photoelectric converter means on which the image of the subject is formed by one of said range finding optical systems.

2. A range finding optical mechanism according to claim 1, wherein said photosensitive elements comprise light-sensing elements.

3. A range finding optical mechanism according to claim 1, further comprising third regulating means for varying the relation between the optical axes of said two range finding optical systems.

4. A range finding optical mechanism according to claim 3, wherein said third regulating means is arranged to vary the relation between the optical axes of said two range finding optical systems independently in three directions perpendicular to one another.

5. A range finding optical mechanism according to claim 1 further comprising fourth regulating means for rotatively displacing the entire range finding optical mechanism relative to two predetermined axes perpendicular to each other.

6. A range finding optical mechanism according to claim 5, wherein said mechanism is mounted on a camera and wherein the two rotary axes, about which said range finding optical mechanism is displayable by said third regulating means, are perpendicular to the phototaking optical axis of the camera.

* * * * *